Aug. 29, 1933.    J. D. ALLEY    1,924,267

METHOD OF MAKING LININGS FOR CASTING MOLD CAVITIES

Original Filed Aug. 22, 1929

Inventor:
John D. Alley
By Wm. O. Belt, Attorney

Patented Aug. 29, 1933

1,924,267

UNITED STATES PATENT OFFICE 1,924,267

METHOD OF MAKING LININGS FOR CASTING MOLD CAVITIES

John D. Alley, Pittsburgh, Pa., assignor to The American Brake Shoe and Foundry Company, Wilmington, Del., a Corporation of Delaware Original application August 22, 1929, Serial No. 387,817. Divided and this application July 29, 1932. Serial No. 626,032

4 Claims. (Cl. 25—156)

This application is a division of my original application Serial No. 387,817, filed August 22, 1929.

The invention relates to casting molds and its object is to provide a novel and simple method of making a lining of low thermal conductivity for a part of the wall or for the entire wall of a mold cavity to prevent chilling the casting and which lining shall be capable of resisting repeated heat shocks without cracking, spalling, or breaking down and also be strong and substantial to withstand the wear and tear of repeated casting operations.

In practicing my invention for making a lining for a brake shoe mold I employ fused silica and a refractory binder. A typical composition which I have found satisfactory for making a lining for a brake shoe mold consists of 60% fused silica and 40% refractory binder. The refractory binder may consist of 50% Kentucky ball clay and 50% Georgia kaolin. The percentage of clays may vary from 15% to 50% with a corresponding change in the proportion of fused silica. I may also use a percentage of silicon carbide for a part of the fused silica in a composition as follows: fused silica 40%, silicon carbide 20%, Kentucky ball clay 20%, and Georgia kaolin 20%. The thermal conductivity of silicon carbide is comparatively high and it is not desirable to use more than 25% of it in substitution for fused silica.

All materials should be ground or crushed to pass through a relatively fine screen, depending upon the quality of the refractory desired. Of each material I have used approximately one-half of 20 to 80 mesh and one-half of 80 mesh and finer to provide a compact aggregate and a dense refractory with smooth face, without voids, and with enough relatively coarse aggregate to make a structurally strong body. The material should be thoroughly mixed in a dry-pan, in a pug mill, or in any other suitable manner. The blocks or sections or liners for lining in whole or in part the wall of the mold cavity may be formed from a wet mix by molding or by pressing; or they may be formed from what is commonly known as a dry mix, which contains about 7% of water, under pressure of as much as one ton or more per square inch. After the refractory shapes are formed they are thoroughly dried to drive off excess moisture, and then they are heated. This heat treatment should be sufficient to vitrify the binder without devitrifying the fused silica and the temperature should be maintained until the binder is entirely vitrified, and followed by slow cooling depending upon the size and section of the shapes. For example, the heat treatment may be continued in a suitable furnace for a period of about four to five hours until the temperature has raised to 2100° F., and then for about six hours at 2100° F., followed by slow cooling in the furnace for about twelve to fifteen hours. It is important that the firing temperature should not be carried to a degree which would tend to devitrify the fused silica and change it into a crystalline form sensitive to heat shocks.

The invention may be employed for making a lining of any dimensions and configuration for a mold for making any kind of casting. I have used the lining in an iron mold for making brake shoes in which the wall of the mold cavity was partly or entirely lined with blocks or sections made in accordance with my invention and in the accompanying drawing I have illustrated the lining embodied in a selected type of brake shoe mold and referring to which Fig. 1 is a longitudinal sectional view of the mold in which the wall of the mold cavity is principally but not entirely provided with a refractory lining.

Figure 1:
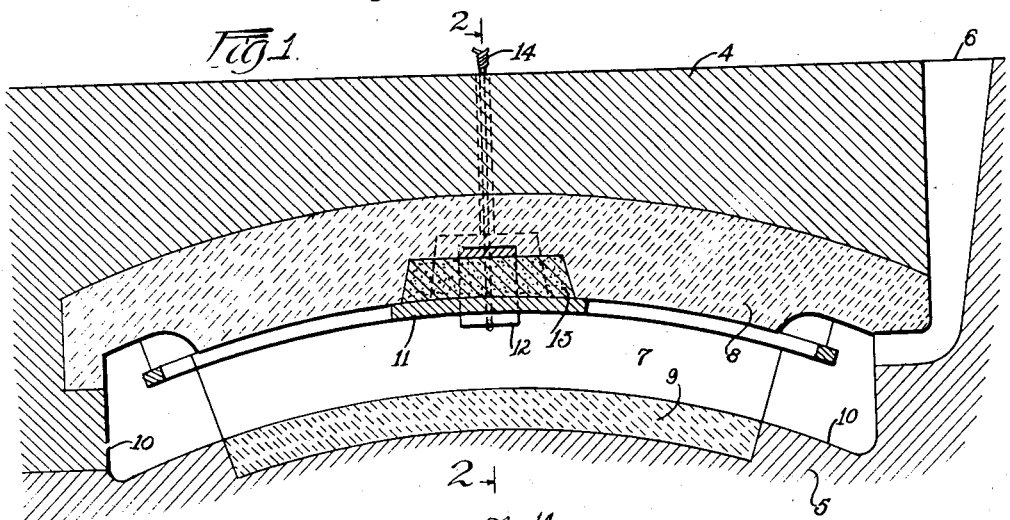
Figure 2:
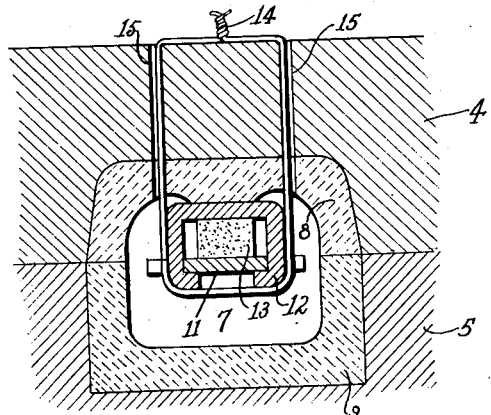
Fig. 2 is a transverse sectional view on the line 2—2 of Fig. 1.
Figure 3:
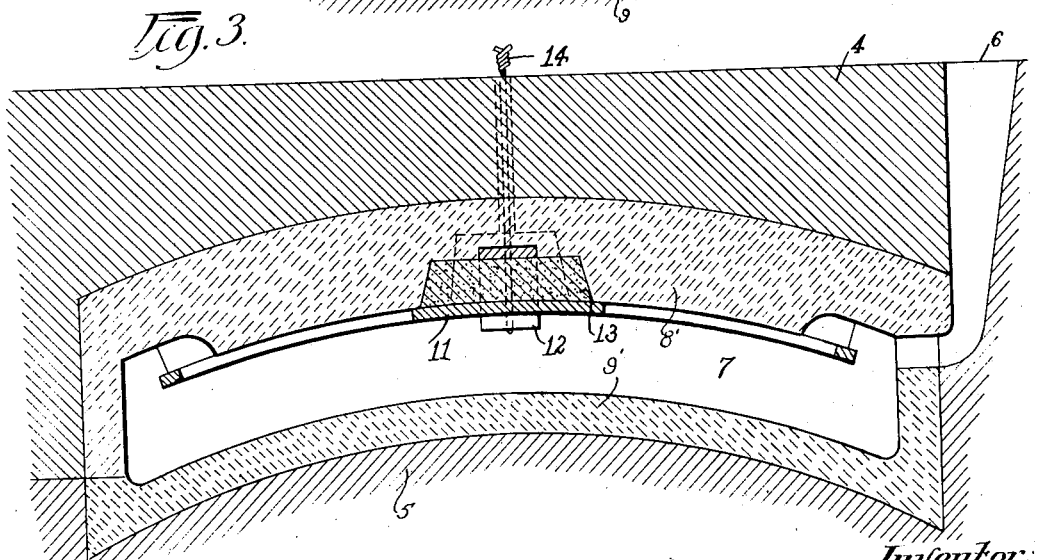
Fig. 3 is a longitudinal sectional view similar to Fig. 1 showing the mold cavity wall fully lined with refractory material.

Referring to the drawing, 4 is the cope and 5 is the drag of the mold, the cope being centered and seated on the drag in any suitable manner and provision being made for removing the cope from the drag at the conclusion of the casting operation by any suitable means. A pouring gate 6 is provided at any desired location in the mold through which the molten metal is poured into the mold cavity 7 formed partly in the cope and partly in the drag. The type of brake shoe to be produced in the mold of Figs. 1 and 2 is a cast iron shoe having its end portions chilled and other parts unchilled. For this purpose the cope has a lining section 8 and the drag has a lining section 9 seated therein to form the wall of the mold cavity except at the end portions 10 which are formed by the metal of the cope and drag. A reenforce back 11 with the lug strap 12 and lug core 13 are held in place at the top of the mold cavity by a wire 14 passing through the vent openings 15 or in any other suitable manner. The shoe cast in this mold will be unchilled except at the ends which will be chilled where the molten metal contacts with the iron of the mold. The mold of Fig. 3 is the same as the mold of Figs. 1 and 2 except that the lining sections 8', 9' also form the ends of the mold cavity.

The blocks or sections are made in any shape required to form in part or in whole the wall of the mold cavity in an iron mold otherwise often referred to as a permanent mold or as a repetition mold. The lining prevents the cast metal from chilling, it does not crack or spall or break down under the repeated heat shocks of repetition casting operations, and it is structurally strong and substantial to withstand the wear and tear of repeated casting operations.

I have given herein examples of materials and proportions, and have also given firing periods and temperatures which have been found to be satisfactory in producing lining shapes for use in iron molds for casting brake shoes, but I do not limit the invention to these particular specifications because it will be apparent to those skilled in the art that they may be varied more or less to suit different conditions and to make linings for different molds in accordance with the method herein described. I have also given certain clay materials which I consider most desirable for the purpose but other materials producing the same or equivalent results may be substituted.

I claim:

1. The herein described method of making a lining for a casting mold cavity which consists in mixing comminuted fused silica and a bonding material, forming the mix into shapes and drying the shapes, and then heat treating the shapes at a temperature sufficient to vitrify the bonding material but not sufficient to devitrify the fused silica.

2. The herein described method of making a lining for a casting mold cavity which consists in mixing comminuted fused silica and a bonding material, forming the mix into shapes and drying the shapes, heat treating the shapes at a temperature sufficient to vitrify the bonding material but not sufficient to devitrify the fused silica, and then slow cooling the shapes.

3. The herein described method of making a lining for a casting mold cavity which consists in mixing comminuted fused silica and a clay bonding material, forming the mix into shapes and drying the shapes, heat treating the shapes in an oven to 2100° F. during a period of approximately four to five hours and continuing the heat treatment for approximately six hours at 2100° F., and then slow cooling the shapes for approximately twelve to fifteen hours.

4. The herein described method of making a lining for a casting mold cavity which consists in mixing 60% comminuted fused silica and 40% refractory binder consisting of substantially 50% Kentucky ball clay and 50% Georgia kaolin, forming the mix into shapes and drying the shapes, heat treating the shapes by raising the temperature in an oven to 2100° F. during a period of approximately four to five hours and continuing the heat treatment for approximately six hours at 2100° F. and then slow cooling the shapes for approximately twelve to fifteen hours.

JOHN D. ALLEY.